(12) United States Patent
Sun et al.

(10) Patent No.: US 6,429,397 B1
(45) Date of Patent: Aug. 6, 2002

(54) PROGRAMMABLE POGO WELDING APPARATUS AND METHOD

(75) Inventors: Peter C. Sun, Rochester Hills; Pei-Chung Wang, Troy; Charles Weldon Wampler, II, Birmingham; Douglas Martin Linn, Commerce Township, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/778,621

(22) Filed: Feb. 8, 2001

(51) Int. Cl.[7] .................................................. B23K 9/32
(52) U.S. Cl. ........................ 219/86.25; 219/87; 219/88; 219/91.2
(58) Field of Search ................................ 219/86.25, 87, 219/88, 91.2, 86.1, 61.5, 86.41, 86.7, 119

(56) References Cited

U.S. PATENT DOCUMENTS

| | | | | |
|---|---|---|---|---|
| 1,123,558 A | * | 1/1915 | Lachman |
| 1,189,584 A | * | 7/1916 | Kicklighter |
| 1,269,617 A | * | 6/1918 | Ledwinka |
| 2,033,851 A | * | 3/1936 | Roth |
| 2,803,739 A | * | 8/1957 | Bentzen |
| 3,668,362 A | * | 6/1972 | Kirchner et al. |
| 3,895,210 A | * | 7/1975 | Olson et al. |
| 4,160,147 A | * | 7/1979 | Matsubara et al. |
| 4,343,981 A | * | 8/1982 | Connolly |
| 4,940,874 A | * | 7/1990 | Ritter et al. |
| 4,985,611 A | * | 1/1991 | Iida et al. |
| 6,271,496 B1 | * | 8/2001 | Domschot |
| 6,337,456 B1 | * | 1/2002 | Taniguchi et al. |

FOREIGN PATENT DOCUMENTS

| | | | |
|---|---|---|---|
| JP | 02001071148 A | * | 3/2001 |
| JP | 02001071149 A | * | 3/2001 |

* cited by examiner

Primary Examiner—Tom Dunn
Assistant Examiner—Kiley Stoner
(74) Attorney, Agent, or Firm—Jeffrey A. Sedlar; George A. Grove

(57) ABSTRACT

A pogo welding apparatus especially for spot welding metal sheets at selected locations spaced away from their edges wherein the sheets are held in a temporary assembly with the selected locations engaged and separate programmable positioners move a primary (pogo) electrode and a backup electrode sequentially against opposite sides of the selected locations to spot weld the sheets at the selected locations in sequence. Various alternative programmable positioners, including robots of varying types, may be used to carry the electrodes.

9 Claims, 6 Drawing Sheets

PROGRAMMABLE POGO WELDING APPARATUS AND METHOD

TECHNICAL FIELD

This invention relates to spot welding apparatus, particularly to so-called pogo welding with a single electrode welding gun.

BACKGROUND OF THE INVENTION

It is known in the art relating to spot welding to connect the central portions of large sheet assemblies by so-called pogo welding. In this method, a welding gun having a single electrode is moved sequentially to a series of welding locations at each of which spot welding is performed by transmitting current from the welding gun electrode through the sheets to be joined to backup electrodes located below the specified welding locations.

FIG. 1 shows the concept of a prior pogo welding apparatus 10, which includes a programmable robot 12 having a linearly movable base 13 supporting a movable jointed arm 14 carrying a welding gun 16 with a single pogo electrode 18. The electrode is connected electrically with a transformer 20, also connected with an electrically-conductive stand 22. The stand supports a plurality of copper backup electrodes 24, each of which engages one of selected welding locations 25 on the lower side 26 of a temporary or loose assembly of two metal sheets, supported on the stand to be spot welded into a permanent assembly 28.

In operation, the pogo electrode 18 is moved sequentially by the robot 12 to each of the selected locations 25 on the opposite upper side 30 of the assembly 28. There, the electrode engages the upper side 30 opposite from each of the backup electrodes 24 in sequence. At each location 25, the welding gun 16 is energized to conduct welding current through the assembly 28 to the opposite backup electrode 24, spot welding the metal sheets together.

In this prior arrangement, a part of the welding current travels through the metal sheets to the neighboring backup electrodes 24 while the remainder passes through the assembly between the opposing electrodes to perform the spot welding process. Significant current shunting may lead to discrepant welds. The prior process requires a different table or tool tray specifically designed to engage the selected locations for each differing component design that is to be spot welded. Thus, a new or modified component requires provision of a modified welding fixture with the backup electrodes positioned in the changed locations.

SUMMARY OF THE INVENTION

The present invention replaces the conductive stand or tray with a suitable support, where needed, and a programmable positioner carrying a single backup electrode. The support holds the metal sheets in temporary assembly during the spot welding procedure. The positioner carries the single backup electrode on a movable head, which is universally movable within a desired envelope. The positioner is programmed to move the backup electrode sequentially to the various selected locations to be spot welded so that the backup electrode is positioned against one side of the sheet assembly at selected locations when the robot-carried pogo electrode is moved against the opposite side of the assembly at the respective selected locations. Various types of positioners may be utilized which may be suitable for the particular components to be welded.

Unlike the prior table or tray with multiple prepositioned backup electrodes arranged for use with a single component design, the positioner of the invention may be used with differing component designs as may be desired by merely reprogramming the controller for the positioner instead of requiring a new or modified electrode tray or table. The invention further eliminates shunting of welding currents away from the active welding location, since only two opposing electrodes are provided for conducting current through each of the selected welding locations. Thus, weld quality becomes more consistent and the fixture costs resulting from design changes are substantially reduced.

These and other features and advantages of the invention will be more fully understood from the following description of certain specific embodiments of the invention taken together with the accompanying drawings.

DESCRIPTION OF THE PREFERRED EMBODIMENT

Figure 1:
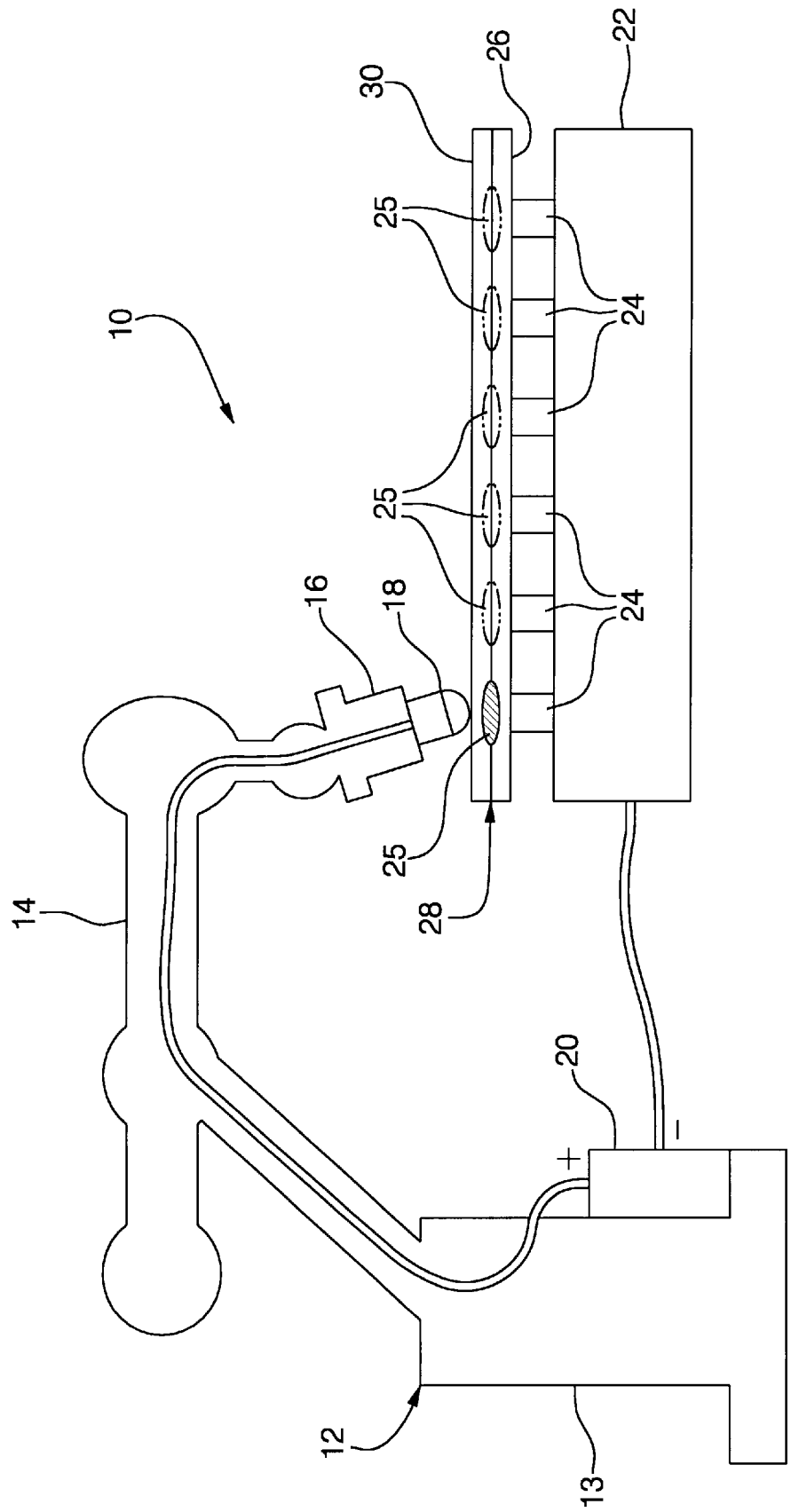
FIG. 1 is a schematic side view of a prior art pogo welding apparatus.
Figure 2:
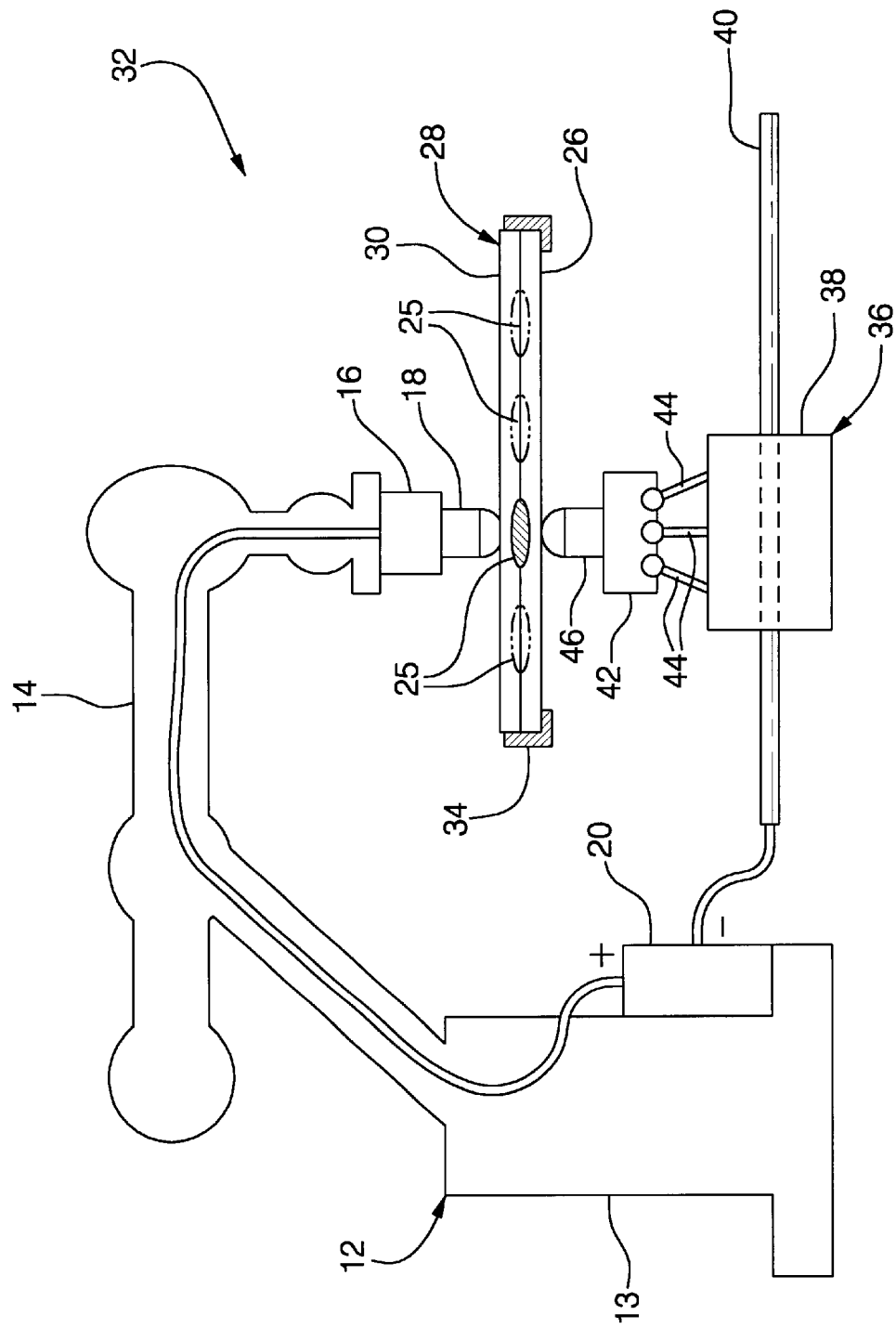
FIG. 2 is a view similar to FIG. 1 showing an improved apparatus according to the invention.

Referring now to FIG. 2 of the drawings in detail, numeral 32 generally indicates a programmable pogo welding apparatus according to the invention. Apparatus 32 includes a first positioner in the form of a robot 12 as in the prior art embodiment. If appropriate, any other suitable form of programmable positioner may be substituted for the robot 12 within the scope of the invention. The robot 12 includes a base 13, a jointed arm 14 carrying a welding gun 16 with a pogo electrode 18 connected with an electrical transformer 20 carried on the base 13 as before. A workpiece in the form of an assembly 28 of two metal sheets has lower and upper sides 26, 30 as in the prior art embodiment.

Apparatus 32 differs in that the workpiece assembly 28 is carried by a suitable holding fixture or support 34 for supporting the assembly in position to be spot welded. A programmable manipulator or positioner 36 is located beneath the assembly and includes a base 38 that is linearly movable along a rail 40 extending about the length of the assembly 28. The base 38 carries a positionable head 42 adjustably supported by a plurality of control arms 44. The head carries a copper backup electrode 46, which is electrically connected through the positioner 36 to the transformer 20. The control arms 44 and the base 38 are adjustable by programmable controls, not shown, to adjust the position of the base along the rail 40 and the attitude and position of the head 42 relative to the base 38.

In operation, the backup electrode 46 is thus movable along the length of the assembly 28 by linear movement of the base 38 and is adjustable laterally and by tilting if needed to reach selected welding locations 25 on the back, or lower side 26, of the workpiece assembly 28. Spot welding is accomplished by the programmed robot 12 moving the pogo electrode 18 along the upper side 30 of assembly 28 sequentially from one to the next of the selected locations 25 at which spot welding is to be performed. Concurrently, the positioner 36 moves the backup electrode 46 along the lower side 26 sequentially to the corresponding selected locations 25 of the assembly 28. Each spot weld is then completed one at a time when both electrodes are then in place on opposite sides of a selected location 25, and the process is repeated at each location until the welding sequence is complete. The programmed robot 12 and positioner 36 are then moved to their loading positions, the finished assembly 28 is removed from the holding fixture and a new unfinished assembly is loaded in the holding fixture to be welded.

Figure 3:
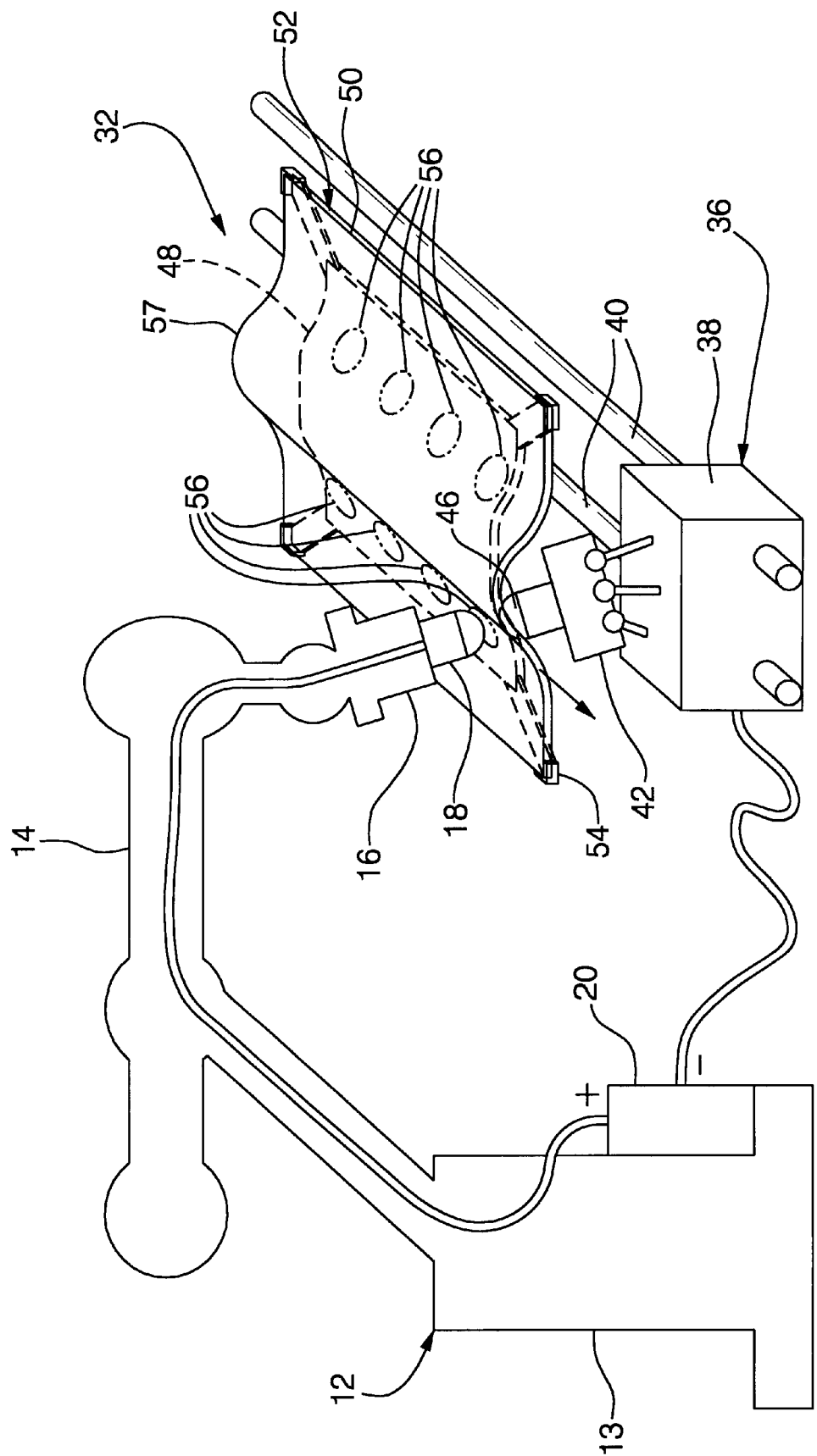
FIG. 3 is a similar view showing application of an alternative apparatus.

FIG. 3 illustrates an application of the apparatus 32 of FIG. 2 to spot welding of a tunnel undershield 48 to a tunneled floor pan 50 of a vehicle to form a floor pan assembly 52. The components of the assembly 52 are again carried in a suitable holding fixture or support 54. The robot 12 and the positioner 36 are then controlled to concurrently move the pogo electrode 18 and backup electrode 46 to opposite sides of the assembly 52 at selected welding locations 56 where spot welding is performed along opposite sides of the tunnel 58. In this application, the positioner head 42 moves both linearly along the rails 40 with the positioner 36 and also moves laterally, as well as tilting, to place the backup electrode 46 in direct opposition to the pogo electrode 18 at each of the selected locations 56.

Figure 4:
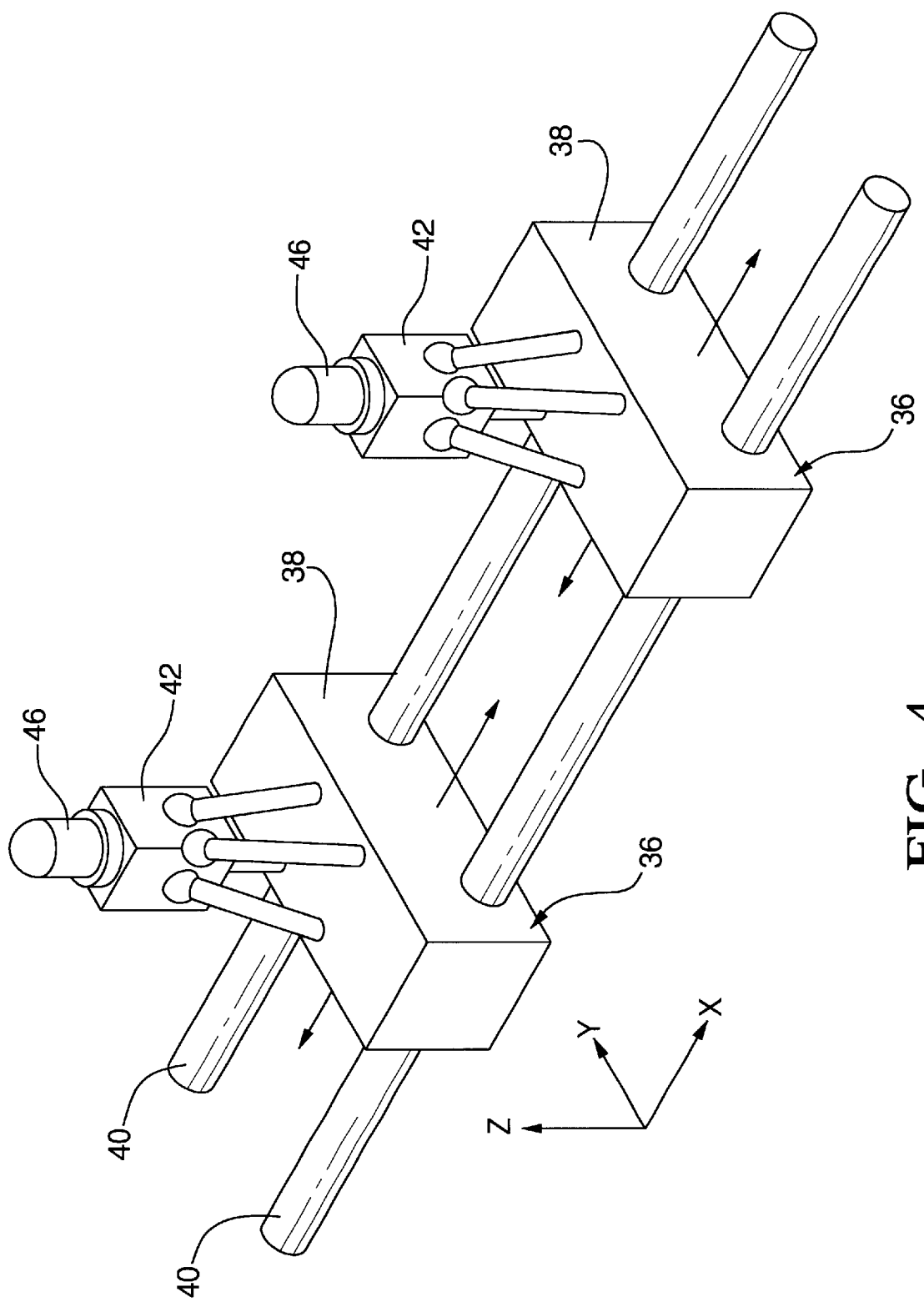
FIG. 4 is a view showing multiple positioners for increasing assembly output.

FIG. 4 shows a variation of the embodiment of FIG. 3 wherein a pair of positioners 36 are spaced linearly along the rails 40. Each of the positioners carries a backup electrode 46 on a head 42 adjustably mounted on a base 38 as in FIG. 3. The spaced positioners 36 are located so that two robots 12 may be operated concurrently with the positioners 36 to weld a floor pan and undershield assembly similar to assembly 52 in a shortened period of time.

Because the tunnel assembly 52 of FIG. 3 is aligned longitudinally along the central axis (or X axis) of a vehicle, the rails 40 will be aligned parallel with the central axis, and the mechanism carried by the base 38 may be limited to two-dimensional operation with three degrees of freedom in the Y-Z plane normal to the X-axis. FIGS. 5–8, wherein like numerals indicate like parts, illustrate four alternative mechanisms which could be used to provide the required motions for the positioners 36 of FIGS. 3 and 4. These embodiments are all based on a two-loop, eight-bar topology with three actuated joints.

Figure 5:
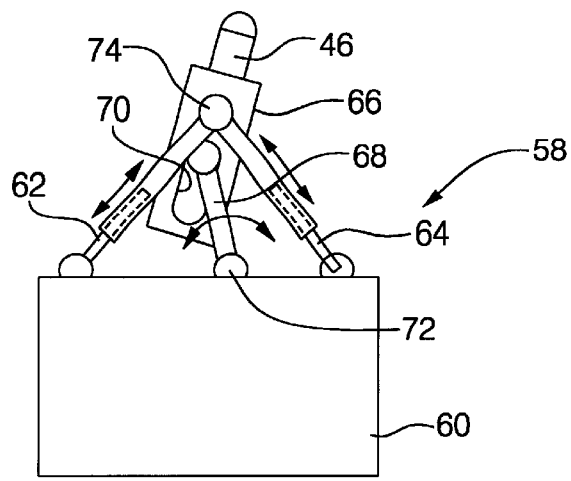
FIGS. 5–8 are schematic side views of various planar positioners usable in the apparatus of FIG. 3.

FIG. 5 shows a mechanism 58 having a base 60 pivotably connected by two telescoping bars 62, 64 to an upper portion of a head 66 carrying a backup electrode 46. A third bar 68 of fixed length is pivotable on the base 60 and engages a slide 70 in the lower portion of the head 66. By extending and/or retracting the bars 62, 64, the head 66 may be raised or lowered and moved laterally from side to side. Rotation of the third bar 68 around its lower pivot 72 tilts the head 66 about the upper pivot 74 and adjusts the attitude of the electrode 46 to a position normal to the portion of the assembly to be welded at each location.

Figure 6:
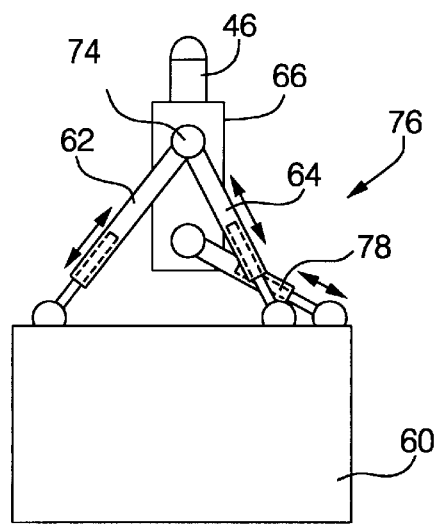

FIG. 6 shows a similar mechanism 76 with a base 60, telescoping bars 62, 64, head 66 and backup electrode 46 as in FIG. 5. A third telescoping bar 78 is pivotally connected between the base 60 and the lower end of the head 66. Bars 62, 64 move the head as in FIG. 5. Extension and retraction of the third bar 78 tilts the head about its upper pivot 74 to adjust the attitude of electrode 46.

Figure 7:
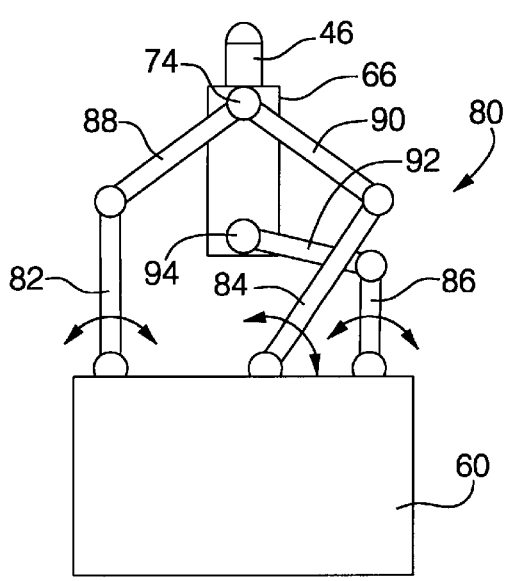

FIG. 7 shows a mechanism 80 with a base 60 mounting three pivotable bars 82, 84, 86 that rotate about lower pivots at the base 60. Bars 82, 84 connect with links 88, 90, respectively, which, in turn, connect to an upper pivot 74 of the head 66. Bar 86 connects with link 92 that also connects with a lower pivot 94 of the head. Rotating bars 82, 84 about their lower pivots raises or lowers the head 66 or moves it laterally as desired. Rotating bar 86 tilts the head 66 about its upper pivot 74 to adjust the attitude of the electrode 46 as desired.

Figure 8:
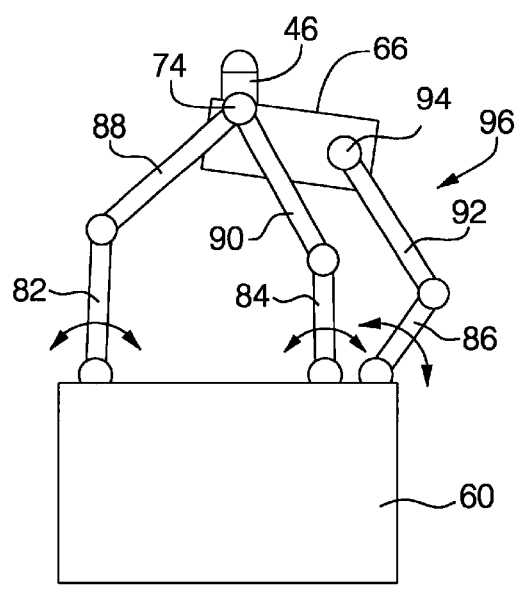

FIG. 8 shows a mechanism 96, which is a variation of the embodiment of FIG. 7, wherein the head 66 is generally horizontal and the electrode 46 is mounted on an upper side of the head near its pivot 74. Rotating bars 82, 84, 86 move and tilt the head 66 and electrode 46 as in FIG. 7 so that only the orientation of the head 66 is changed.

Figure 9:
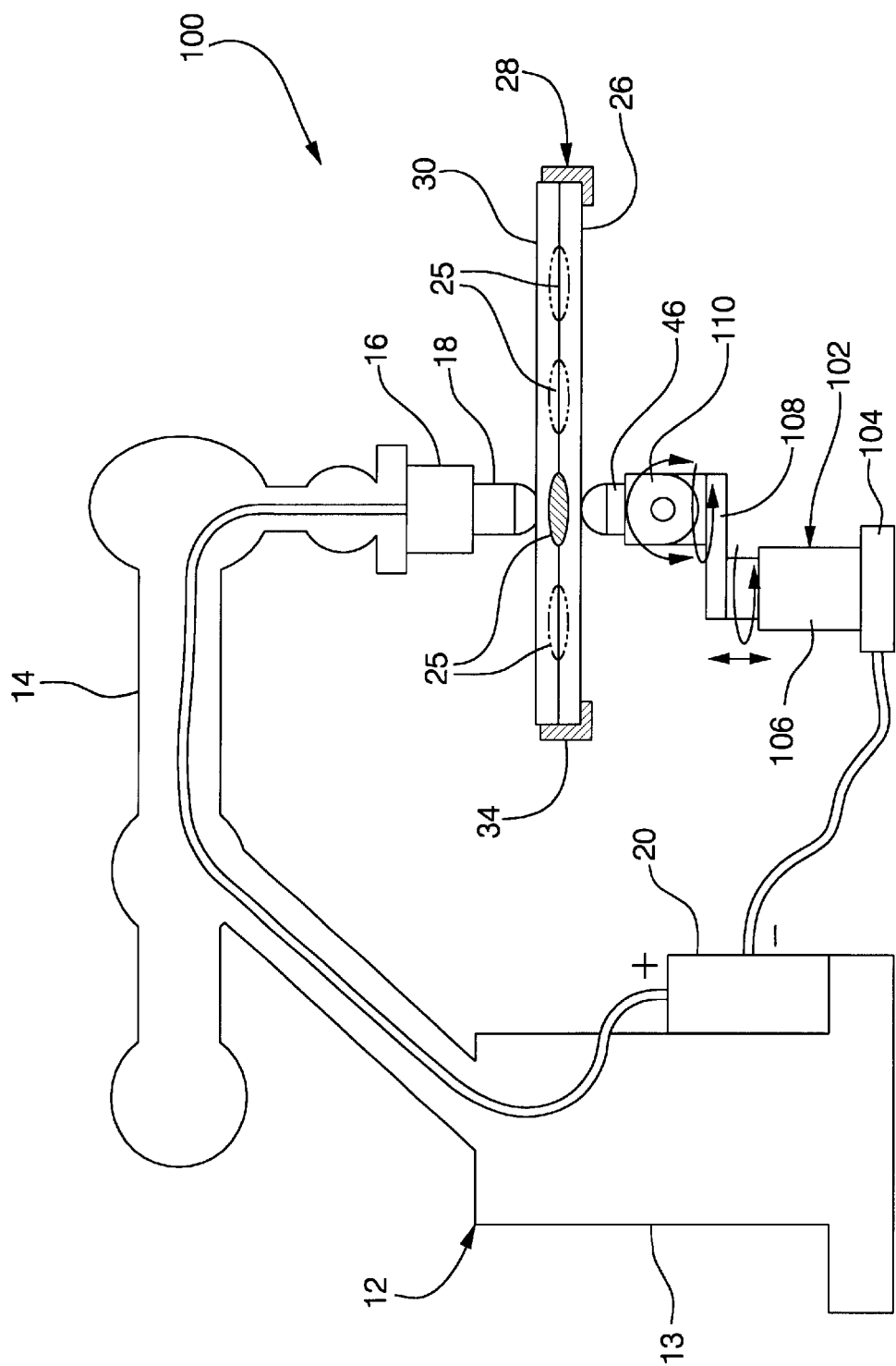
FIG. 9 is a view similar to FIG. 2 showing an alternative programmable positioner.

FIG. 9 shows an alternative pogo welding apparatus 100 similar to that of FIG. 2 except for the use of a different form of positioner 102. The positioner 102 includes a linearly movable base 104 supporting a column 106 that is both vertically extendable and rotatable about a vertical axis, not shown. A lateral arm 108 carried by the column supports a vertical head 110 that is rotatable and tiltable to adjust a backup electrode 46 mounted thereon. Positioner 102 is operated by internal motors and mechanisms controlled by a programmable control, not shown, to move the electrode 46 sequentially to engage the lower side 26 of the workpiece assembly 28 at various selected positions 25. The robot moves the pogo electrode 18 against the upper side 30 of the assembly at the same locations, and the welding procedure is completed sequentially at the selected locations.

The positioner 102 may be considered as a specialized form of robot that is used to support and move the backup electrode 46 in completing the pogo spot welding procedure. The inventors further contemplate the alternative use of other forms of robots or positioner mechanisms that are programmable to follow the positioning motions of the robot 12, or other positioner, in sequentially placing the electrodes 18, 46 on opposite sides of the workpiece assembly 28 to complete the welding operations at each of the selected locations.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method for automatic spot welding of metal sheets, the method comprising:

combining a pair of metal sheets into a temporary assembly having at least selected locations in contact for spot welding the sheets together;

supporting the temporary assembly in position with both sides of the selected locations exposed for engagement;

automatically actuating a first programmable mechanism to move a welding gun with a first electrode into engagement with one side of the assembly at the selected locations in sequence;

automatically actuating a second programmable mechanism to move a backup electrode electrically connectable with the welding gun into concurrent engagement with an opposite side of the assembly at the corresponding selected locations in sequence; and actuating the welding gun during engagement of both electrodes with the assembly at each of the selected locations to sequentially spot weld the metal sheets together at the selected locations.

2. A method as in claim 1 wherein the programmable mechanisms are positioners.

3. A method as in claim 2 wherein at least one of the programmable mechanisms is a robot.

4. Apparatus for automatic spot welding of metal sheets, the apparatus comprising:

a support for holding a pair of metal sheets in a temporary assembly with opposing surfaces in contact for spot welding at selected locations;

first and second electrodes selectively engageable with opposite sides of the assembly at the selected locations for conducting spot welding current to weld the sheets together at said locations;

a first positioner programmable to move the first electrode to sequentially engage each of the selected locations on one side of the assembly; and a second positioner programmable to move the second electrode to simultaneously engage each of the selected locations on an opposite side of the assembly for spot welding of the assembly at said locations.

5. Apparatus as in claim 4 wherein at least one of the positioners includes a parallel link mechanism.

6. Apparatus as in claim 5 wherein said mechanism includes a pair of triangularly-related positioning and supporting links.

7. Apparatus as in claim 5 wherein said mechanism is linearly movable along a track.

8. Apparatus as in claim 4 wherein at least one of the positioners includes a serial axis mechanism.

9. Apparatus as in claim 8 wherein said at least one positioner is a robot arm mechanism.

* * * * *